United States Patent
Dessertenne et al.

(10) Patent No.: US 8,499,101 B2
(45) Date of Patent: Jul. 30, 2013

(54) METHOD AND DEVICE FOR COMMUNICATION BY ADDRESS VIRTUALIZATION FOR THE INTEGRATION SIMULATION OF COMPONENTS

(75) Inventors: Franck Dessertenne, Colomiers (FR); Jean-Francois Copin, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 866 days.

(21) Appl. No.: 12/635,088

(22) Filed: Dec. 10, 2009

(65) Prior Publication Data

US 2010/0186021 A1    Jul. 22, 2010

(30) Foreign Application Priority Data

Dec. 10, 2008   (FR) ...................................... 08 58445

(51) Int. Cl.
*G06F 15/16* (2006.01)

(52) U.S. Cl.
USPC ........................................................ 709/250

(58) Field of Classification Search
USPC ........................................................ 709/250
See application file for complete search history.

(56) References Cited

U.S. PATENT DOCUMENTS

| 6,701,377 | B2 * | 3/2004 | Burmann et al. | 709/249 |
| 7,672,262 | B2 * | 3/2010 | McCoy et al. | 370/316 |
| 8,046,499 | B2 * | 10/2011 | Seiler | 709/253 |
| 2002/0042845 | A1 * | 4/2002 | Burmann et al. | 709/249 |
| 2007/0019560 | A1 * | 1/2007 | Brewer et al. | 370/252 |
| 2008/0294915 | A1 | 11/2008 | Juillerat et al. | |

FOREIGN PATENT DOCUMENTS

| EP | 1 294 132 | 3/2003 |
| WO | WO 01/37492 A1 | 5/2001 |
| WO | WO 01/45348 | 6/2001 |

* cited by examiner

*Primary Examiner* — Larry Donaghue
(74) *Attorney, Agent, or Firm* — Oblon, Spivak, McClelland, Maier & Neustadt, L.L.P.

(57) ABSTRACT

A method and a device for exchanging data between a computer and at least one expansion card of an equipment item having a network interface and at least one expansion card is disclosed. The computer and the network interface are connected by a communication network. The network interface and the at least one expansion card are connected to the same industrial bus. After assignment of a virtual network address in the communication network to the at least one expansion card, the network interface is configured with the virtual network address in order to make it possible to identify the network interface in the communication network as representing the at least one expansion card.

10 Claims, 4 Drawing Sheets

METHOD AND DEVICE FOR COMMUNICATION BY ADDRESS VIRTUALIZATION FOR THE INTEGRATION SIMULATION OF COMPONENTS

This invention relates to the simulation of integration of components and more particularly to a method and a device for exchange of test messages by virtualization of addresses in a communication network comprising equipment items provided with expansion cards.

Simulation of the integration of components in a vehicle, in particular in an aircraft, is used especially to ensure the development and integration of the electronic and/or computer systems on board same.

Thus, the integration of components in vehicles is the subject of simulations according to which input/output devices, or input/output cards, are used as an interface between the real components of the vehicle, such as, for example, computers, sensors and drives, and a simulation environment generally comprising one or more computers used to simulate the performance of the vehicle or of a part thereof. Each input/output card has a given number of input paths and output paths.

The complexity of the simulation environment is linked to that of the set of components of the vehicle being used. In the field of aircraft, it generally is necessary to resort to several computers or servers to simulate the various situations which the components are likely to have to confront. A network, allowing communication between the various computers or servers and the input/output electronic devices, generally is used.

The network formed in this way is, for example, of the "switch fabric" type, based on a switched architecture, that is, the terminal equipment items responsible for the transmission and reception of data are organized around switches responsible for the transport of these data. The switch is responsible for transmitting in parallel requests originating from computers or from servers to input/output cards and responses originating from input-output cards to the computers or servers. The same request and the same response must be able to be addressed by the switch to several addressees.

The network used can be based on an existing standard, for example the Ethernet standard (IEEE 802.3) which describes a local network protocol with switching of packets.

Because of the number of components used in the simulation, it generally is necessary to utilize numerous input/output cards. These can be consolidated in one or more equipment items comprising a computation unit, generally used as a sole communication interface. Such an equipment item, also called rack in English terminology, typically comprises an industrial communication bus, called industrial bus in the remainder of the description, to which there are connected the computation unit, comprising a sole network interface, and a plurality of input/output cards, themselves connected to the components the integration of which is simulated.

FIG. 1 illustrates an exemplary environment that can be used to simulate the integration of components in an aircraft. Environment 100 here comprises a network 105 to which there are connected computers or servers 110-1 to 110-3, generically called computers in the remainder of the description, as well as equipment items 115-1 and 115-2 comprising input/output cards. The components the integration of which is simulated here are components 120-11 to 120-13 and 120-21 to 120-23, generically referenced 120, connected to equipment items 115-1 and 115-2, respectively.

By way of illustration, equipment item 115-2 here comprises a computation unit 125-2, also called CPU (abbreviation for Central Processing Unit in English terminology), as well as 12 input/output cards, including input-output card 130-23.

The tools for testing and for simulation of the integration of components 120 are implemented on computers 110-1 to 110-3, each computer being able to implement one or more tools.

In order to test the integration of one or more components 120, an operator uses a test tool implemented on one of computers 110-1 to 110-3 in order to transmit data to one or more components 120 in the form of requests addressed to one or more input/output cards via one of equipment items 115-1 and 115-2. The test results, obtained in the form of responses to the requests, are analyzed by the operator who in this way checks the progress of the simulation.

Nevertheless, if the communication network 105 used is a standard network, for example of Ethernet type, equipment items 115-1 and 115-2 generally use specific industrial buses, for example VME or PCI (abbreviation for Peripheral Component Interconnect in English terminology) type buses in order to connect the input-output cards to the computation unit.

Thus, in order to exchange data between a computer and an input/output card, it is necessary to take into account the protocol used by the communication system connecting the computer to the equipment item comprising the input/output cards as well as the communication characteristics specific to the industrial bus used in the equipment item comprising the input/output card.

Consequently, when one equipment item is replaced by another, using different communication characteristics, it is necessary to adapt the test tools, or the network interfaces used in the computers, accordingly.

Therefore there exists a need for definition of a communication strategy making the protocol used in the communication network independent of the hardware architecture of the equipment items used.

The invention makes it possible to resolve at least one of the problems set forth above.

The invention thus has as an object a method for exchanging data between a computer and at least one expansion card of an equipment item comprising a network interface and at least one expansion card, the said computer and the said network interface being connected by a communication network, the said network interface and the said at least one expansion card being connected to the same industrial bus, the method comprising the following steps:

assigning to the said at least one expansion card a virtual network address in the said communication network; and, configuring the said network interface with the said virtual network address in order to make it possible to identify the said network interface in the said communication network as representing the said at least one expansion card.

In this way the method according to the invention allows a computer connected to the communication network to consider the expansion card independently of the communication protocol implemented between the expansion card and the network interface of the equipment item.

The method preferably further comprises the following steps, receiving by the said network interface of at least one message, the said at least one message comprising at least one datum and at least one virtual network address corresponding to at least one expansion card of the said equipment item;

analyzing the said at least one virtual network address received in order to identify at least one expansion card of the said equipment item corresponding to the said at least one virtual network address received; and, in response to the said analysis step, transmitting, via the said industrial bus, the said at least one datum received in the said at least one message to the said at least one expansion card identified corresponding to the said at least one virtual network address received.

In this way the method according to the invention allows a computer connected to the communication network to transmit data to the expansion card independently of the communication protocol implemented between the expansion card and the network interface of the equipment item. Change in the communication protocol implemented between the expansion card and the network interface of the equipment item therefore does not affect the applications executed by the computers connected to the communication network.

The method according to the invention advantageously further comprises the following steps, receiving at least one datum from the said at least one expansion card of the said equipment item via the said industrial bus;

encapsulating in a message the said at least one datum received from the said at least one expansion card with the virtual network address that is associated therewith; and, transmitting the said message to the said communication network.

In this way the method according to the invention allows a computer connected to the communication network to identify the expansion card from which it is receiving data, independently of the communication protocol implemented between the expansion card and the network interface of the equipment item. Change in the communication protocol implemented between the expansion card and the network interface of the equipment item therefore does not affect the applications executed by the computers connected to the communication network.

According to a specific embodiment, the said virtual network address associated with the said at least one expansion card of the said equipment item is an IP-type address of which a first element refers to the said equipment item and a second element refers to the said network interface or to the said at least one expansion card of the said equipment item. The software developed to communicate with the expansion card therefore is in conformity with the commonly accepted addressing standards.

Again according to a specific embodiment, the said configuration step uses a mechanism for creation of an alias corresponding to the said virtual network address associated with the said at least one expansion card of the said equipment item. The method according to the invention thus can be implemented easily in standard equipment items.

The invention also has as an object a computer program comprising instructions adapted for implementing each of the steps of the method described above when the said program is executed on a computer.

The invention also has as an object a device for exchange of data between a computer connected to a communication network and an expansion card of an equipment item comprising at least one expansion card connected to an industrial bus, the device comprising the following means, means for connection to the said communication network;
means for connection to the said industrial bus;

means for assignment of a virtual network address in the said communication network to the said at least one expansion card; and, means for configuration of the said means for connection to the said communication network in order to make it possible to identify them in the said communication network as representing the said at least one expansion card.

In this way the device according to the invention allows a computer connected to the communication network to consider the expansion card independently of the communication protocol implemented between the expansion card and the network interface of the equipment item.

The device according to the invention preferably further comprises the following means, means for reception of at least one message via the said means for connection to the said communication network, the said message comprising at least one datum and at least one virtual network address corresponding to the at least one expansion card of the said equipment item;

means for analysis of the said at least one virtual address received in order to identify at least one expansion card of the said equipment item corresponding to the said at least one virtual network address received; and, means for transmission of the said at least one datum received to the said at least one expansion card identified corresponding to the said at least one virtual network address received via the said means for connection to the said industrial bus.

In this way the device according to the invention allows a computer connected to the communication network to transmit data to the expansion card independently of the communication protocol implemented between the expansion card and the network interface of the equipment item. Change in the communication protocol implemented between the expansion card and the network interface of the equipment item therefore does not affect the applications executed by the computers connected to the communication network.

The device according to the invention advantageously further comprises the following means, means for reception of at least one datum from at least one expansion card of the said equipment item via the said means for connection to the said industrial bus;

means for encapsulation, in a message, of the said at least one datum received from an expansion card and of the virtual network address that is associated therewith; and, means for transmission of the said message to the said communication network via the said means for connection to the said communication network, In this way the device according to the invention allows a computer connected to the communication network to identify the expansion card from which it is receiving data independently of the communication protocol implemented between the expansion card and the network interface of the equipment item. Change in the communication protocol implemented between the expansion card and the network interface of the equipment item therefore does not affect the applications executed by the computers connected to the communication network.

According to a specific embodiment, the said means for configuration comprise means adapted for creating at least one alias corresponding to the said virtual network address of the said at least one expansion card of the said equipment item. The device according to the invention thus can be used easily in standard equipment items.

Other advantages, purposes and characteristics of this invention become apparent from the detailed description that follows, presented by way of non-limitative example, with reference to the attached drawings in which.

Figure 4:
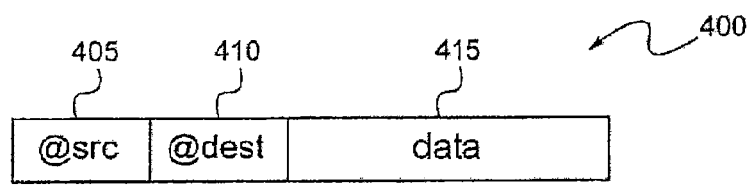
Figure 5:
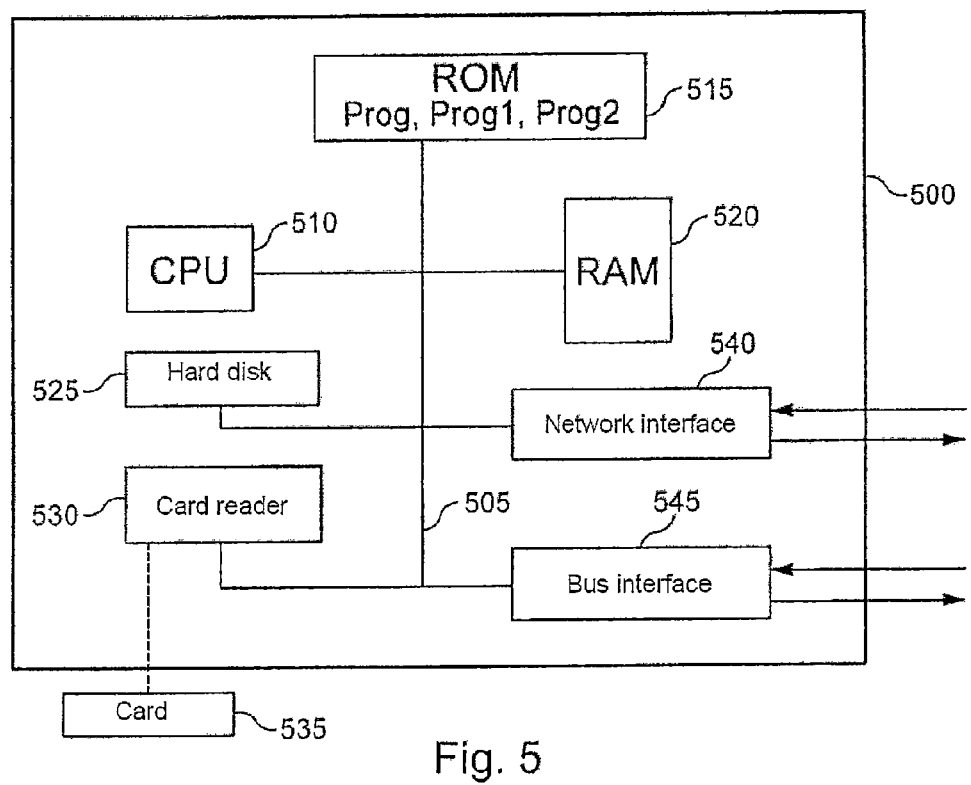

FIG. 4 schematically shows an exemplary message transmitted in the form of an IP frame; and, FIG. 5 illustrates an exemplary device adapted for implementing the invention or a part of the invention.

In general, the invention is intended to consider each input/output-type expansion card of an equipment item comprising a computation unit and a plurality of expansion cards as a device independent of the communication network to which there are connected the computers used to simulate the integration of the components connected to the expansion cards. In this way, it is considered that each expansion card virtually has its own network address, for example, an IP address (abbreviation for Internet Protocol in English terminology) allowing a point-to-point type communication, also called unicast address.

Furthermore, the assignment of a virtual network address to each expansion card allows the addressing of these cards by group (made up of real or virtual components) according to a communication mode called multicast.

According to a specific embodiment, a computation component is used as an interface between the network and the expansion cards. This component makes it possible to receive messages intended for expansion cards, according to the network protocol and the virtual network addresses of the cards, in order to retransmit them to the expansion cards according to the communication characteristics specific to the link established between the computation component and the expansion cards.

In this way, access to the expansion cards from a system connected to the communication network is achieved as if these expansion cards were directly connected to the communication network.

Figure 1:
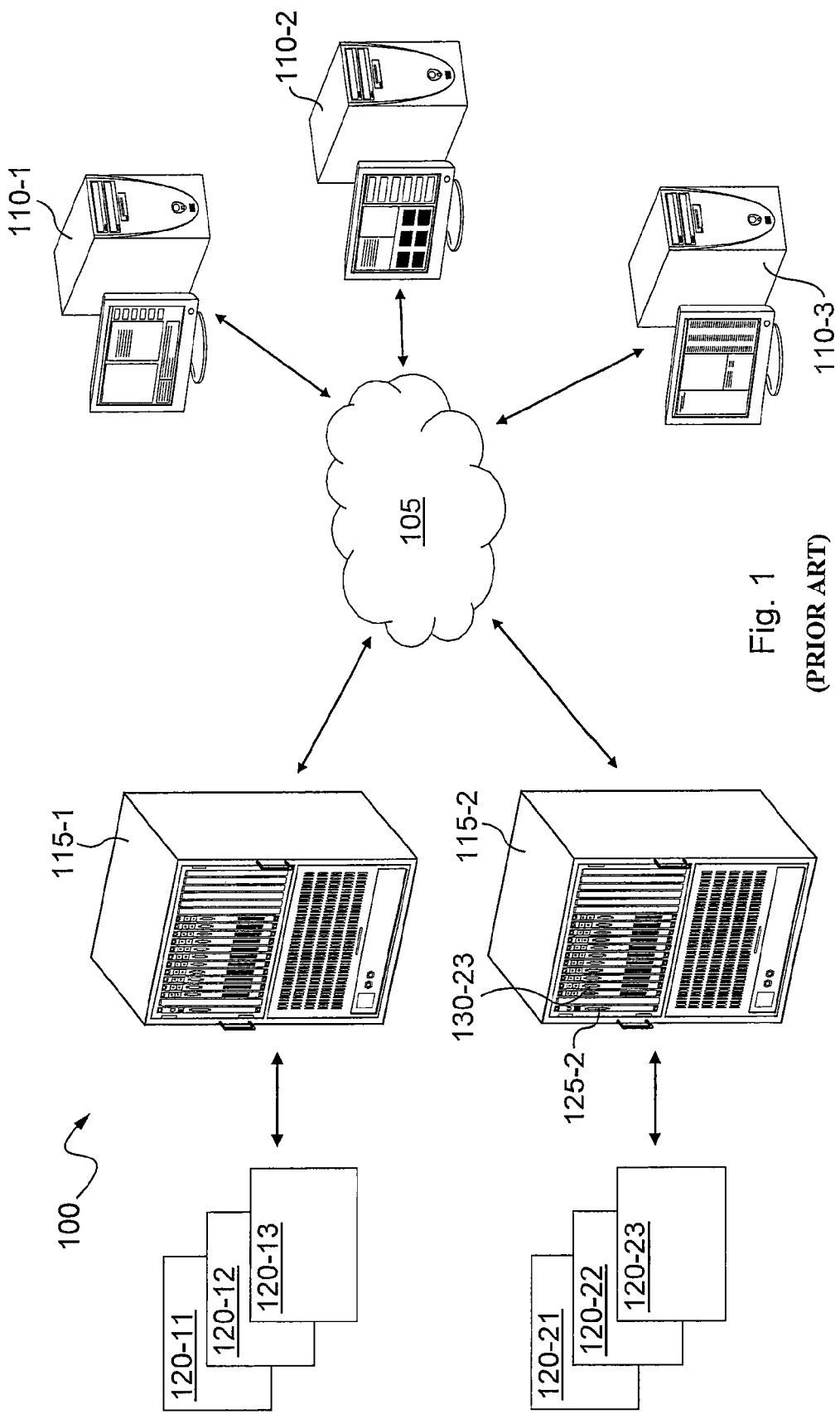
FIG. 1 shows an exemplary environment that can be used to simulate the integration of components in an aircraft.
Figure 2:
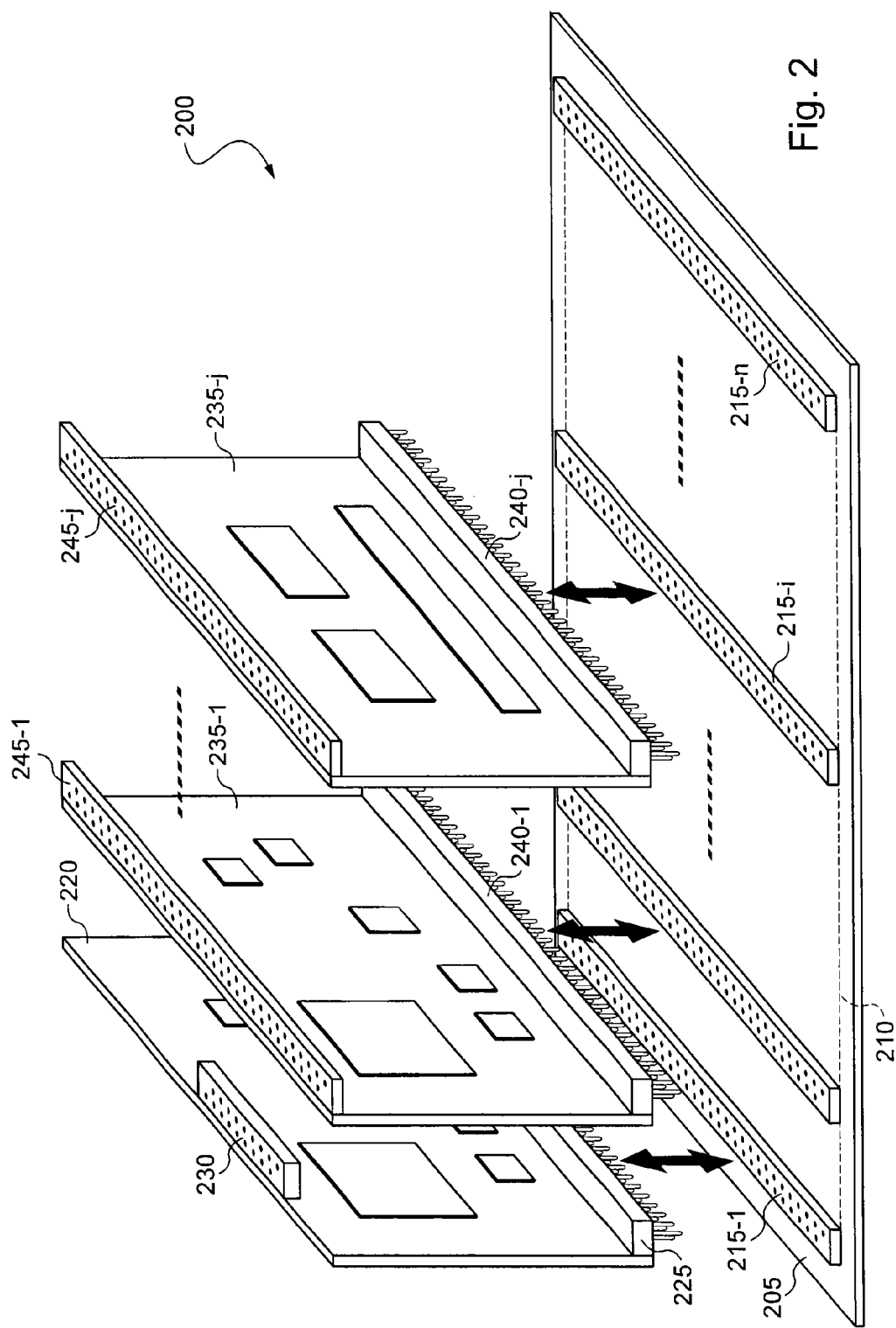
FIG. 2 illustrates an exemplary equipment item comprising a computation unit and a plurality of input/output cards, adapted for implementing the invention.

FIG. 2 illustrates an exemplary equipment item comprising a computation unit and a plurality of input/output-type expansion cards, adapted for implementing the invention. Equipment item 200 here comprises a card 205 of PCB (abbreviation for Printed Circuit Board in English terminology) type, also called backplane in English terminology, comprising an industrial bus 210, for example a VME bus, to which connectors 215-1 to 215-n are connected.

Connectors 215-1 to 215-n are adapted for accommodating expansion cards of different kinds, compatible with industrial bus 210. In particular, connectors 215-1 to 215-n are adapted for accommodating a card 220 comprising a computation unit and a network interface. Card 220 comprises a connector 225 adapted for cooperating with one of connectors 215-1 to 215-n as well as a connector 230 adapted for connecting card 220 to a communication network.

Connectors 215-1 to 215-n likewise are adapted for accommodating input/output cards 235-1 to 235-j. Each input/output card here comprises a connector adapted for connecting the card to the backplane 205 via one of these connectors, for example connectors 240-1 and 240-j, as well as one or more input/output connectors making it possible to connect the card to components used for the simulation, for example connectors 245-1 and 245-j.

In such an equipment item, a specific addressing system is implemented by hardware or software means. For example, the address of a card can be defined by using a set of switches of DIP (acronym for Dual Inline Package in English terminology) type integrated into the card. Alternatively, the address can be predetermined in accordance with the position of the connectors of the backplane or defined by software means upon initialization of the equipment item.

Such an addressing, generally specific to the industrial bus used, allows a card to transmit or receive data intended for or originating from a particular card. In general, communication on such a bus is initialized by a specific card, called master in English terminology, which orchestrates communication among the other cards.

The computation unit here is used, in particular, to convert such an address into a network address, for example an IP address, and vice versa.

In version 4, the IP addresses, called IPv4, generally are defined with four numbers between 0 and 255, separated by periods. Thus, according to a preferred format, the virtual IP address of each input/output card belonging to a given equipment item is in the following form, <A>.<B>.<reference of the equipment item>.<reference of the card> where A and B are determined by specification and define a private network of class B, "reference of the equipment item" is a number ranging from 0 to 255 designating a specific equipment item and "reference of the card" is a number from 2 to 254 designating a particular input/output card in the equipment item considered, advantageously the position of the card on the industrial bus connecting the computation unit and the input/output cards.

Thus, by way of illustration, the address 128.203.15.10 designates the input/output card having the reference 10 in the equipment item having the reference 15 in the network defined by the network address 128.203.

The computation unit of each equipment item preferably configures its unicast IP address in accordance with its geographic location on the bus connecting it to the input/output cards. The computation unit, or CPU, being considered the point of entry for the equipment item or leading component, it advantageously has the first address on the industrial bus, that is, the following unicast IP address, <A>. <B>.<reference of the equipment item>.1

The computation unit advantageously is used as a relay to mask the industrial bus connecting it to the input/output cards to which it is connected. In this way the messages transmitted and received by the computers on the communication network are defined semantically as if the input/output cards were directly connected to the communication network.

Furthermore, the computation unit configures its network interface to create as many unicast IP addresses as there are input/output cards connected to the industrial bus to which it is connected. In this way, a unicast IP address of type <A>.<B>.<reference of the equipment item>.<k> is created for each input/output card connected to the k address, or k slot in English terminology.

Nevertheless, while an IPv4 address makes it possible to exclusively identify each machine in a communication network, the computation unit uses a mechanism called IP aliasing in English terminology to allocate several unicast IP addresses to a sole network interface. The virtual network addresses of the input/output cards thus are allocated to the computation unit in the form of aliases. In this way, the computation unit the IP address of which is A.B.ref_equipment item.1 receives all the messages intended for input/output cards connected to the same industrial bus as this equipment item, that is to say, all the messages intended for the addresses A.B.ref_equipment.i configured beforehand.

The computation unit then is in charge of transmitting these messages, on the industrial bus, to the input/output cards for which the messages are intended according to the communication characteristics furthermore defined beforehand (specifications of the communication protocol), used in the computation unit.

Similarly, the computation unit is to receive the data from the input/output cards on the industrial bus to which it is connected in order to transmit messages via its network interface. The data received from the cards are encapsulated in the form of messages according to the protocol of the communication network, the source address of these messages being the unicast IP address of the input/output card at the origin of these data, such as configured in the computation unit.

It should be noted here that while the example described for purposes of illustration is based on IPv4, the invention can be implemented in similar manner with other types of addressing mode, for example with IPv6 in which two bytes can be used to reference the equipment items and the cards, the other bytes being set by specification to define a network.

Figure 3:
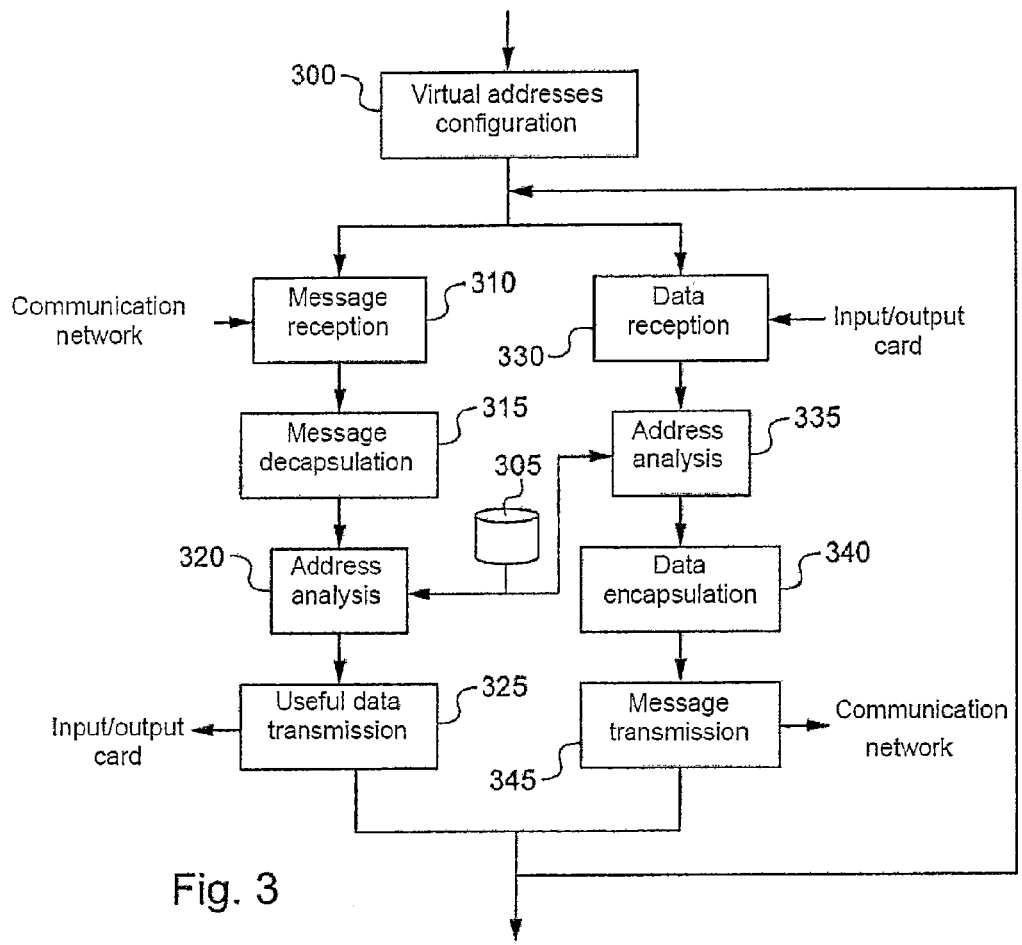
FIG. 3 illustrates an exemplary algorithm that can be used in a computation unit connected to a communication network to allow the exchange of data between a system connected to this communication network and input/output cards connected to the computation unit via an industrial bus.

FIG. 3 illustrates an exemplary algorithm that can be used in a computation unit connected to a communication network to allow the exchange of data between a system connected to this communication network and input/output cards connected to the computation unit via an industrial bus.

A first step has as an object to configure the equipment item comprising the computation unit (step 300). This step seeks in particular to establish a link between the virtual network addresses of the input/output cards and the real addresses of these cards on the industrial bus. These links can be stored in database 305, for example in table form in which each line represents an input/output card, the values of a first column corresponding to the virtual network addresses and the values of a second column corresponding to the real addresses on the industrial bus.

It should be mentioned here that the virtual network addresses and/or the real addresses on the industrial bus can be predetermined or, on the contrary, determined dynamically during initialization of the equipment item. Such a dynamic configuration here is performed in standard manner.

The configuration of the virtual network addresses also has as an object to configure the computation unit by creating aliases so that it receives all the messages originating from the communication network intended for the input/output cards connected to this computation unit.

When the computation unit and the virtual network addresses of the input/output cards are configured, the computation unit is ready to receive messages from a communication network in order to transfer them to the input/output cards the addresses of which are specified in the message in the form of network addresses and to receive data from the input/output cards in order to transfer them to the communication network.

After having been received from the communication network (step 310), the messages are disencapsulated to extract in particular the destination virtual network address as well as the useful data (step 315). The destination virtual network address then is analyzed to find the real address of the addressee input/output card or cards for the data received (step 320). This analysis consists, for example, in comparing the virtual network address with those contained in database 305 in order to identify the real address of the corresponding input/output card or cards on the industrial bus.

The useful data then are transmitted to the input/output cards the real addresses of which on the industrial bus have been identified in step 325.

Similarly, when the data are received from an input/output card intended for the communication network (step 330), the real address of the card on the industrial bus is analyzed to find the corresponding virtual network address (step 335). This analysis is performed here with the aid of database 305.

The data then are encapsulated in a message, for example a UDP frame, comprising a reference to the source address of the message, here the virtual network address of the input/output card from which the data are received (step 340), then transmitted to the communication network (step 345). The network address of the addressee of the message is determined by the computation unit or the input-output card. It thus can be transmitted to the computation unit with the data or in parallel manner.

As illustrated, the process is repeated for each message and/or datum received.

FIG. 4 schematically shows an exemplary message transmitted in the form of an IP frame. IP frame 400 comprises in particular a source IP address 405, that is to say the IP address of the system having transmitted the message, a destination IP address 410, that is to say the IP address of the system for which the message is intended and the data 415 to be transmitted.

Thus, when frame 400 represents a message transmitted to an input/output card, IP address 410 represents the virtual network address of this card. Vice versa, when frame 400 comprises data deriving from an input/output card, IP address 405 represents the virtual network address of this card.

A computation unit adapted for implementing the invention or a part of the invention is illustrated on FIG. 5.

Device 500 here comprises an internal communication bus 505 to which there are connected:
  a central processing unit or microprocessor 510 (CPU, abbreviation for Central Processing Unit in English terminology);
  a read-only memory 515 (ROM, acronym for Read Only Memory in English terminology) that can comprise the programs necessary for implementation of the invention;
  a random-access memory or cache memory 520 (RAM, acronym for Random Access Memory in English terminology) comprising registers adapted for recording variables and parameters created and modified in the course of execution of the aforesaid programs;
  a first communication interface 540 adapted for transmitting and receiving data to and from a communication network, for example a switched-type network;
  a second communication interface 545 adapted for transmitting and receiving data to and from an industrial communication bus, for example a VME bus.

Device 500 preferably also has the following components:
  a hard disk 525 that can comprise the aforesaid programs and data processed or to be processed according to the invention; and
  a memory card reader 530 adapted for receiving a memory card 535 and reading or writing therein data processed or to be processed according to the invention.

The internal communication bus permits communication and interoperability among the different components included in device 500 or connected thereto. The depiction of the internal bus is not limitative and, in particular, the central unit is able to communicate instructions to any component of device 500 directly or via another component of device 500.

The executable code of each program permitting the programmable device to implement the processes according to the invention can be stored, for example, on hard disk 525 or in read-only memory 515.

According to a variant, memory card 535 can contain data, in particular a table of correspondence between the events detected and the commands that can be requested, as well as the executable code of the aforesaid programs which, once read by device 500, is stored on hard disk 525.

According to another variant, the executable code of the programs will be able to be received, at least partially, via first communication interface 540, to be stored in a manner identical to that described above.

More generally, the program or programs will be able to be loaded into one of the storage means of device 500 before being executed.

Central unit 510 is going to control and direct the execution of the instructions or portions of software code of the program or programs according to the invention, which instructions are stored on hard disk 525 or in read-only memory 515 or else in the other aforesaid storage components. During boot-up, the program or programs that are stored in a non-volatile memory, for example hard disk 525 or read-only memory 515, are transferred to random-access memory 520 which then contains the executable code of the program or programs according to the invention, as well as the registers for storing the variables and parameters necessary for implementation of the invention.

The communication apparatus comprising the device according to the invention also can be a programmed apparatus. This apparatus then contains the code of the computer program or programs for example set in an application-specific integrated circuit, also called ASIC (acronym for Application-Specific Integrated Circuit in English terminology).

Naturally, to satisfy specific needs, an individual competent in the field of the invention will be able to apply modifications in the foregoing description.

The invention claimed is:

1. A method for exchanging data between a computer and at least one expansion card of an equipment item that includes a network interface, the equipment item being adapted for accommodating a plurality of expansion cards, the computer and the network interface being connected by a communication network, the network interface and the plurality of expansion cards are connected to a same industrial bus, the method comprising:
   assigning to each of the plurality of expansion cards a different virtual network address in the communication network; and
   configuring the network interface with the different virtual network addresses in order to make it possible to identify the network interface in the communication network as representing the plurality of expansion cards.

2. The method according to claim 1 further comprising:
   receiving by the network interface at least one message, the at least one message including at least one datum and at least one virtual network address corresponding to at least one expansion card of the equipment item;
   analyzing the received at least one virtual network address in order to identify at least one expansion card of the equipment item corresponding to the received at least one virtual network address; and
   in response to the analyzing, transmitting, via the industrial bus, the at least one datum received in the at least one message to the at least one expansion card identified as corresponding to the received at least one virtual network address.

3. The method according to claim 1, further comprising:
   receiving at least one datum from the at least one expansion card of the equipment item via the industrial bus;
   encapsulating in a message the at least one datum received from the at least one expansion card with the virtual network address that is associated therewith; and
   transmitting the message to the communication network.

4. The method according to claim 1, wherein the virtual network address associated with the at least one expansion card of the equipment item is an IP-type address of which a first element refers to the equipment item and a second element refers to the network interface or to the at least one expansion card of the equipment item.

5. The method according to claim 1, wherein the configuring uses a mechanism for creation of an alias corresponding to the virtual network address associated with the at least one expansion card of the equipment item.

6. A non-transitory computer readable medium storing computer instructions which when executed on a computer cause the computer to perform steps comprising:
   assigning to each of plural expansion cards, which are accommodated by an equipment item and which are connected to a same industrial bus, a different virtual network address in a communication network connected to a network interface in the equipment item; and
   configuring the network interface with the different virtual network addresses in order to make it possible to identify the network interface in the communication network as representing the plural expansion cards.

7. A device for exchange of data between a computer connected to a communication network and at least one expansion card of an equipment item, the equipment item being adapted for accommodating a plurality of expansion cards, the plurality of expansion cards being connected to a same industrial bus, the device comprising:
   a network interface unit connected to the communication network;
   a bus interface unit connected to the industrial bus;
   an assignment section configured to assign a different virtual network address in the communication network to each of the plurality of expansion cards; and
   a configuration section that configures the network interface unit with the different addresses in order to make it possible to identify the network interface unit in the communication network as representing the plurality of expansion cards.

8. The device according to claim 7, further comprising:
   a receiver that receives at least one message via the network interface unit, the at least one message including at least one datum and at least one virtual network address corresponding to at least one expansion card of the equipment item;
   an analysis section configured to analyze the received at least one virtual address in order to identify at least one expansion card of the equipment item corresponding to the received at least one virtual network address; and
   a transmitter configured to transmit the received at least one datum to the at least one expansion card identified as corresponding to the received at least one virtual network address via the bus interface unit.

9. A device according to claim 7, further comprising:
   a datum receiver configured to receive at least one datum from at least one expansion card of the equipment item via the bus interface unit;

an encapsulation section configured to encapsulate, in a message, the at least one datum received from the at least one expansion card and the virtual network address that is associated therewith; and a message transmitter that transmits the message to the communication network via the network interface unit.

10. The device according to claim 7, wherein the configuration section is further adapted for creating at least one alias corresponding to the virtual network address of the at least one expansion card of the equipment item.

* * * * *